(12) United States Patent
Ishii et al.

(10) Patent No.: US 9,102,351 B2
(45) Date of Patent: Aug. 11, 2015

(54) ELECTRONIC POWER-STEERING APPARATUS

(75) Inventors: Toru Ishii, Gunma (JP); Takeshi Yamamoto, Gunma (JP); Katsuhiko Sawa, Gunma (JP)

(73) Assignee: NSK Ltd. (JP)

( * ) Notice: Subject to any disclaimer, the term of this patent is extended or adjusted under 35 U.S.C. 154(b) by 0 days.

(21) Appl. No.: 13/810,906

(22) PCT Filed: Jun. 11, 2012

(86) PCT No.: PCT/JP2012/064930
§ 371 (c)(1),
(2), (4) Date: Mar. 13, 2013

(87) PCT Pub. No.: WO2012/173096
PCT Pub. Date: Dec. 20, 2012

(65) Prior Publication Data
US 2014/0182401 A1    Jul. 3, 2014

(30) Foreign Application Priority Data
Jun. 16, 2011 (JP) ................... 2011-133791

(51) Int. Cl.
*F16H 27/02* (2006.01)
*F16H 29/02* (2006.01)
*F16H 29/20* (2006.01)
*B62D 5/04* (2006.01)
*F16H 19/02* (2006.01)
(Continued)

(52) U.S. Cl.
CPC .............. *B62D 5/0409* (2013.01); *F16H 19/02* (2013.01); *F16C 19/163* (2013.01); *F16C 25/08* (2013.01); *F16C 2326/24* (2013.01); *F16H 2057/0213* (2013.01); *Y10T 74/18792* (2015.01)

(58) Field of Classification Search
CPC .......... F16H 2057/0213; F16H 57/021; F16H 2057/0221; F16H 55/24; B62D 5/0409
See application file for complete search history.

(56) References Cited

U.S. PATENT DOCUMENTS 4,227,104 A * 10/1980 Hamman .................... 310/75 R
5,605,071 A *  2/1997 Buchanan, Jr. ................. 74/425
(Continued)

FOREIGN PATENT DOCUMENTS

JP    2002-255047    9/2002
JP    2004-232774    8/2004
(Continued)

*Primary Examiner* — David M Fenstermacher
*Assistant Examiner* — Jake Cook
(74) *Attorney, Agent, or Firm* — Hartman Global IP Law; Gary M. Hartman; Michael D. Winter

(57) ABSTRACT

Construction of an electric power-steering apparatus is achieved that, by stably suppressing backlash of an output shaft 6a of an electric motor 5 over a long period of time, is able to stably reduce vibration and strange noise that occurs during operation. The front end section of the output shaft 6a and the base end section of a worm 7 are connected such that torque can be transmitted and such that relative displacement in the axial direction is possible. An elastic member 31 having an elastic force in a direction that separates the output shaft 6a and worm 7 is provided in the connecting section between the output shaft 6a and the worm 7. Due to the elastic force of the elastic member 31, together with the tandem arrangement contact angles, the preload is applied to a pair of ball bearings 14a, 14b that support the output shaft 6a with respect to the motor case 13 such that the output shaft 6a can rotate freely.

7 Claims, 7 Drawing Sheets

(51) Int. Cl.
*F16C 19/16* (2006.01)
*F16C 25/08* (2006.01)
*F16H 57/021* (2012.01)

(56) References Cited

U.S. PATENT DOCUMENTS

| | | | |
|---|---|---|---|
| 6,412,591 B1 * | 7/2002 | Endo et al. | 180/427 |
| 6,491,131 B1 * | 12/2002 | Appleyard | 180/444 |
| 6,900,564 B2 * | 5/2005 | Kobayashi et al. | 310/83 |
| 2002/0195893 A1 | 12/2002 | Kobayashi et al. | |
| 2006/0117889 A1 | 6/2006 | Segawa et al. | |
| 2007/0205680 A1 | 9/2007 | Miyoshi et al. | |
| 2011/0155499 A1 * | 6/2011 | Wilkes et al. | 180/444 |
| 2013/0133974 A1 * | 5/2013 | Hamakita et al. | 180/444 |
| 2013/0206497 A1 * | 8/2013 | Fuechsel et al. | 180/444 |

FOREIGN PATENT DOCUMENTS

| | | |
|---|---|---|
| JP | 2004-353767 | 12/2004 |
| JP | 2008-126873 | 6/2008 |
| JP | 2008-213667 | 9/2008 |
| JP | 2008-247190 | 10/2008 |
| JP | 2008-290693 | 12/2008 |
| JP | 2009-018628 | 1/2009 |
| JP | 2009-18628 | 1/2009 |
| JP | 20096-061898 | 3/2009 |
| JP | 2010-1966 | 1/2010 |
| JP | 2010-142057 | 6/2010 |
| JP | 2010-242822 | 10/2010 |

* cited by examiner

1

ELECTRONIC POWER-STEERING APPARATUS

TECHNICAL FIELD

The present invention relates to an electric power-steering apparatus for an automobile.

BACKGROUND ART

Electric power-steering apparatuses that use an electric motor as an auxiliary power source are widely used for reducing the force required for operating a steering wheel when applying a steering angle to the steered wheels of an automobile (normally the front wheels except in special vehicles such as a forklift and the like). Electric power steering apparatuses having various constructions are known, and in all the kinds of constructions, auxiliary power from an electric motor is applied by way of a reduction gear to a steering shaft that is rotated by operating a steering wheel. Typically, a worm reducer is used as this reduction gear. In the case of an electric power-steering apparatus that uses a worm reducer, the auxiliary force from an electric motor is freely transmitted to the steering shaft by a worm that is rotated and driven by the electric motor engaging with a worm wheel that rotates together with the steering shaft.

FIG. 5 and FIG. 6 illustrate an example of a conventional electric power-steering apparatus. The front-end section of a steering shaft 2 is supported by the inside of a housing 3 so as to be able to rotate freely, and a worm wheel 4 is fastened to the front-end section of this steering shaft 2. A worm 7 that is fastened to an output shaft 6 of an electric motor 5 engages with this worm wheel 4. By the electric motor 5 rotating and driving the worm 7, auxiliary torque having a specified size and direction is applied to the worm wheel 4. The worm 7 comprises a worm shaft 8 and worm teeth 9 that are provided in the middle section in the axial direction of the outer circumferential surface of the worm shaft 8, and the base end section and the tip end section of the worm shaft 8 are supported inside the housing 3 by way of a pair of ball bearings 10a, 10b so as to be able to rotate freely. Moreover, a spline hole 11 that is open on the base end surface of the worm shaft 8 fit with the spline shaft section 12 that is provided on the tip end section of the output shaft 6 with a spline fit. On the other hand, the output shaft 6 is supported inside a motor case 13 by way of a pair of ball bearings 14a, 14b so as to be able to rotate freely.

During operation of this kind of electric power-steering apparatus, the electric current direction and amount supplied to the electric motor 5 is controlled according to the direction and size of the torque that is applied to the steering shaft 2 from the steering wheel 1. By applying appropriate auxiliary torque to the steering shaft 2 by way of the worm 7 and worm wheel 4, it is possible to transmit torque to a steering gear unit 16 by an intermediate shaft 15 that is greater than the torque that is inputted from the steering shaft 2. As a result, a pair of left and right tie rods 17 are pushed or pulled by a force that is larger than the operating force that is applied from the steering wheel 1, so it is possible to apply a desired steering angle to the left and right steered wheels even with a small operating force.

When doing this, the direction and size of the auxiliary torque frequently changes, so without taking various measures, beating noise or vibration is generated in the parts, and gives an unpleasant feeling to the passengers. Therefore, in the engaging section between the worn 7 and the worm wheel 4, by elastically pressing the ball bearing 10b on the tip end side of the worm 7 toward the worm wheel 4, backlash in this engaging section is eliminated and the generation of a gear rattling sound is prevented.

Moreover, placing an elastic member in between the tip end surface of the output shaft of the electric motor and the base end surface of the worm shaft, and suppressing backlash in the output shaft and worm by elastically pressing the output shaft and worm in directions away from each other is known (refer to JP2002-255047(A), JP2003-72563(A), JP2008-213667(A), JP2008-247190(A), JP2008-290693(A), and JP2009-61898(A)). Furthermore, JP2011-69495(A) discloses the use of a single-row deep groove four point contact ball bearing as the ball bearing for supporting the base end section of the worm shaft.

During operation of an electric power-steering apparatus, in order to suppress backlash that occurs due to minute displacement in the axial direction of the output shaft 6 of the electric motor 5, it is necessary to apply a preload to the pair of ball bearings 14a, 14b that support both end sections of the output shaft 6. In order to accomplish this, as illustrated in FIG. 7, a plate spring (disk spring, spring washer, wave washer or the like) 18 is provided between the base end surface (right end surface in FIG. 7) of the outer ring of the ball bearing 14a on the base end side of the output shaft 6 and the back end surface of the motor case 13. The elastic force of this plate spring 18, together with a face-to-face arrangement (DF) contact angle as indicated by the chain line in FIG. 7, applies a preload to the ball bearings 14a, 14b.

In the case of this conventional construction, a force in the compression direction is repeatedly applied to the plate spring 18 during operation of the electric power-steering apparatus. In other words, as the worm wheel 4 and worm teeth 9 (see FIG. 6) engage, a reaction force from the engaging section is applied to the worm 7 that is provided with worm teeth 9. The direction in which the axial direction component of this reaction force acts is reversed each time the direction of the torque that is transmitted from the worm 7 to the worm wheel 4 changes. On the other hand, the ball bearing 14b on the tip end side of the output shaft 6, as can be clearly seen from the direction of the contact angles illustrated by the chain lines in FIG. 7, has very little function for supporting the component in the axial direction of the reaction force that acts in the direction from the worm 7 to the output shaft 6. Therefore, a force in the compression direction having nearly that magnitude is repeatedly applied to the plate spring 18 the number of times that the direction changes. As a result, from use over a long period of time, the elastic force of the plate spring 18 decreases or is lost, and thus the preload that is applied to the ball bearings 14a, 14b decreases or is lost. Particularly, the installation space for the plate spring 18 is limited, and for the elastic stroke (amount of change in the dimension in the axial direction in a state when an elastic force can be applied) of the plate spring 18, the percentage of the change in this dimension in the axial direction becomes large as the electric power-steering apparatus operates, so the elastic force of the plate spring 18 can easily decrease or be lost.

By providing an elastic member, for which a large elastic stroke compared to a plate spring can be easily maintained, between the tip end surface of the output shaft of the electric motor and the base end surface of the worm shaft as disclosed in JP08-290693(A), backlash in the axial direction of the output shaft is decreased a certain amount, however, is not sufficient. In other words, in the case of a conventional electric motor, both end sections of the output shaft are supported by a pair of ball bearings, and the directions of the contact angles that are applied to the balls of these ball bearings are opposite of each other. That is, a back-to-back arrangement (DB) contact angle or face-to-face arrangement (DF) contact angle is applied to these ball bearings. In either case, when the output shaft, which is supported so as to rotated freely by a pair of ball bearings of which the direction of the contact angles differ from each other, is pressed in the axial direction, the preload for one of the ball bearings increases and the preload for the other ball-bearing decreases. In the case where the preload of this other ball bearing is lost, there is a possibility that a strange noise, such as a beating noise, or vibration may occur in the portion of this other ball bearing. Therefore, by simply providing an elastic member between the tip end surface of the output shaft of the electric motor and the base end surface of the worm shaft, there is a problem in that it is not possible to sufficiently prevent backlash of the output shaft.

RELATED LITERATURE

Patent Literature

[Patent Literature 1] JP2002-255047(A)
[Patent Literature 2] JP2003-72563(A)
[Patent Literature 3] JP2008-213667(A)
[Patent Literature 4] JP2008-247190(A)
[Patent Literature 5] JP2008-290693(A)
[Patent Literature 6] JP2009-61898(A)
[Patent Literature 7] JP2011-69495(A)

SUMMARY OF THE INVENTION

Problem to be Solved by the Invention

Taking into consideration the situation above, the object of the present invention is to achieve construction of an electric power-steering apparatus that is capable of reducing the occurrence of vibration or strange noise that occurs during operation by stably suppressing backlash of the output shaft of the electric motor over a long period of time without a drop in performance.

Means for Solving the Problems

The electric power-steering apparatus of the present invention has a housing, a rotating shaft, a worm wheel, a worm and an electric motor.

The housing is supported by and fastened to a vehicle body or a portion that is fastened to the vehicle body. The rotating shaft has a front-end section that is supported by the housing so as to be able to rotate freely, and is connected to a mechanism that applies a steering angle to steered wheels, and a rear-end section that is connected to a steering wheel. The worm wheel is concentrically supported by and fastened to part of the rotating shaft on the inside of the housing. The worm has a worm shaft that has a base end section and worm teeth provided around the middle section in the axial direction thereof, and, with the worm teeth engaged with the worm wheel, is supported by the housing so as to be able to rotate freely. The electric motor rotates and drives the worm, and has: a motor case that is supported by and fastened to the housing, an output shaft that has a tip end section that is connected to the base end section of the worm shaft so that torque can be transmitted, and a pair of single-row ball bearings that support the output shaft on the inside of the motor case so as to be able to rotate freely.

In the electric power-steering apparatus of the present invention, each of the pair of single-row ball bearings has an outer ring that is supported on the inside of the motor case in a state where displacement in a direction away from the worm is restricted, and an inner ring that fits around a part of the output shaft in a state where displacement in a direction toward the worm is restricted. The base end section of the worm shaft has a base end surface, and an engagement hole that has a non-circular cross sectional shape, is open on the base end surface, and has a back end surface, and the tip end section of the output shaft has an engagement rod section that has a non-circular cross-sectional shape, engages with the engagement hole and has a tip end surface. An elastic member that has an elastic force in the axial direction is held in an elastically compressed state in the axial direction between the back end surface of the engagement hole and the tip end surface of the engagement rod section, and by applying an elastic force to the output shaft in a direction away from the worm, applies a preload, together with a tandem arrangement contact angle, to the pair of single-row ball bearings.

The engagement between the base end section of the worm shaft and the tip end section of the output shaft is preferably a spline fit. In other words, the engagement hole is constructed from a spline hole, and the engagement rod section is constructed from a spline shaft. By the spline hole and spline shaft fitting together, a spline engagement section is formed between the tip end section of the output shaft and the base end section of the worm shaft. The value of the elastic force that is applied by the elastic member is greater than the value of the friction resistance in a state where this friction resistance to displacement in the axial direction of the spline engagement section becomes a maximum, by the transmitted torque becoming a maximum at an engaging section between the warm wheel and the warm, the reaction force in the radial direction that is applied to the worm from the engaging section becoming a maximum and the radial load that is applied to the spline engagement section becoming a maximum.

Preferably, at least one of the outer rings comes in contact with a stepped surface on the inner circumferential side that is formed in part of the motor case by way of a ring-shaped plate spring, the thickness in the axial direction thereof being able to expand and contract. In this case, instead of the plate spring, it is also possible to use a shim plate that is selected from among many kinds of shim plates having different thickness dimensions.

In the electric power-steering apparatus of the present invention, preferably, the base end section of the worm is supported by a four point contact ball bearing on the inside of the housing so as to be able to displace in the axial direction. In this case, elastic members that have an elastic force in a direction in which the dimension in the axial direction elastically expands and contracts are held between both end surfaces in the axial direction of the inner ring of the four point contact ball bearing and the portions that are fastened to the worm shaft.

It is possible to use a compression coil spring as the elastic member that is held between the back end surface of the engagement hole and the tip end surface of the engagement rod section. Alternatively, it is also possible to use a circular column shaped rubber block instead of the compression coil spring.

Effect of the Invention

With the electric power-steering apparatus of the present invention, it is possible to stably suppress backlash in the output shaft of the electric motor over a long period of time. In other words, the direction of the contact angles of the pair of ball bearings for supporting the output shaft of the electric motor on the inside of the motor case so as to be able to rotate freely is the same, and is the direction that the preload is applied to the pair of ball bearings due to the pressure applied to the output shaft by the elastic member. Therefore, it is possible to apply a preload to both of the pair of the ball bearings, or even supposing that it is not possible to apply preload to either of the ball bearings, it is possible to suppress the internal space therein a small amount enough that unpleasant noise and vibration are not generated. Moreover, it is possible to use an elastic member having larger dimensions in the axial direction than the amount of displacement in the axial direction of the output shaft as the elastic member that is held between the back end surface of the engagement hole and the tip end surface of the engagement rod section, so even when used over a long period of time, the elasticity does not decrease or is not lost. As a result, vibration or strange noise that is generated during operation of the electric power-steering apparatus can be stably reduced over a long period of time.

MODES FOR CARRYING OUT THE INVENTION

Example 1

Figure 1:
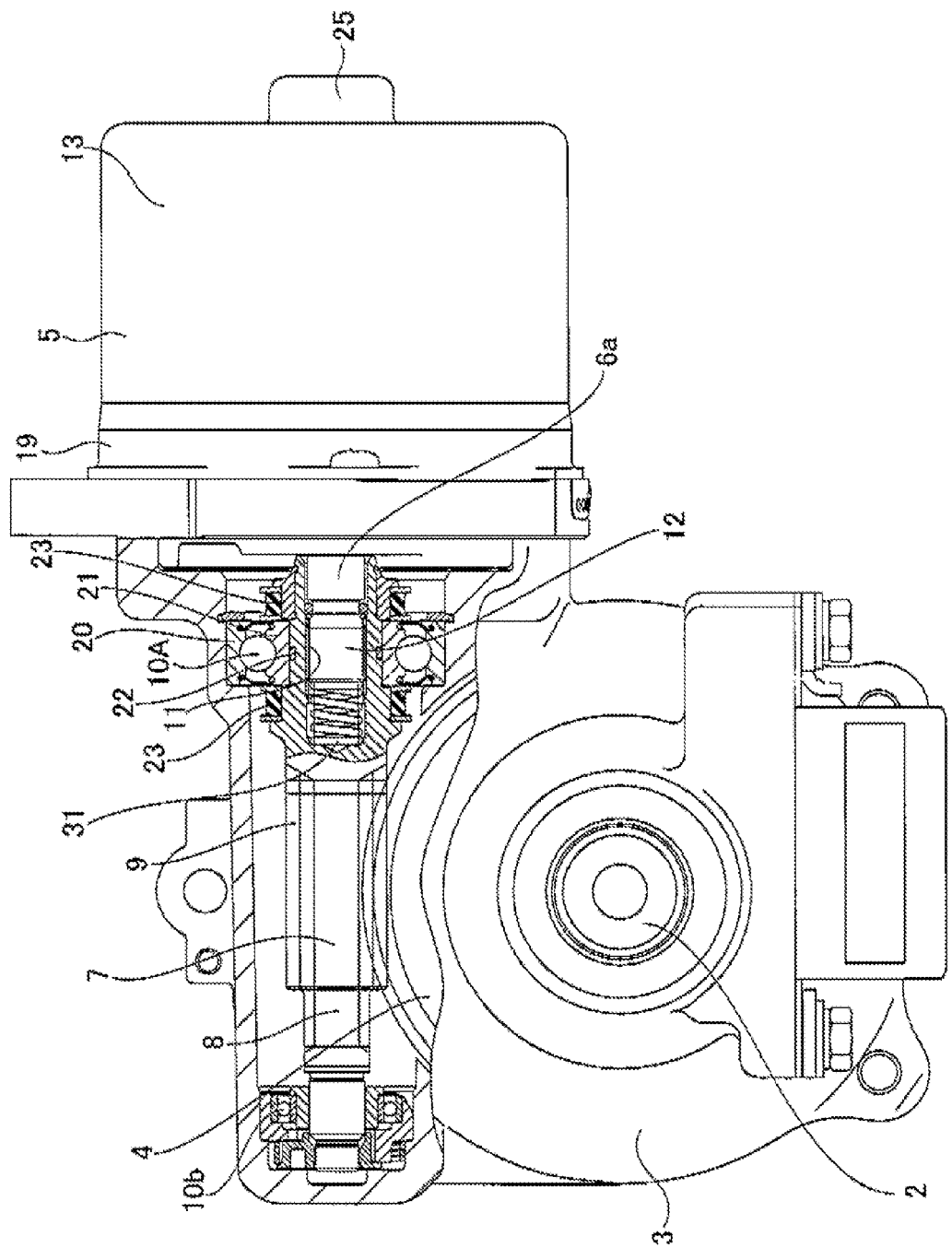
FIG. 1 is a partial cross-sectional view as seen from the same direction as in FIG. 6, and illustrates a first example of an embodiment of the present invention.
Figure 2:
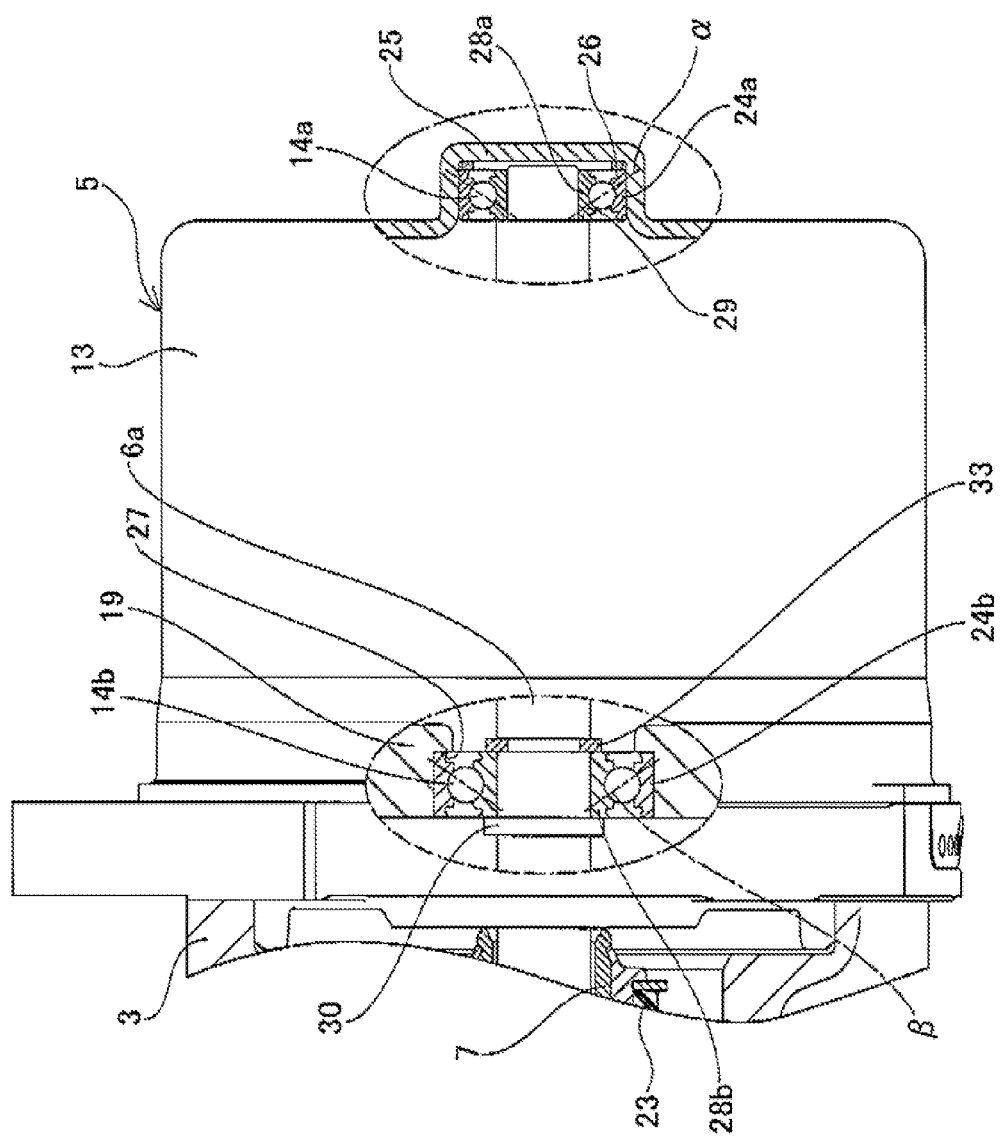
FIG. 2 is a partial cross-sectional view illustrating the upper right part in FIG. 1.

FIG. 1 and FIG. 2 illustrate a first example of an embodiment of the present invention. A feature of this example is construction for supporting the output shaft 6a by the motor case 13 so as to be able to rotate freely, and construction for supporting the engaging section between the tip end section of the output shaft 6a and the base end section of the worm shaft 8 of the worm 7 by the housing 3 so as to be able to rotate freely, such that backlash in the output shaft 6a of the electric motor 5 can be prevented. The construction and functions of other parts are the same as in the conventional construction, so explanations about the construction and function of parts that are the same as those of the conventional construction will be omitted or simplified, with this explanation being centered on the features of this example.

Figure 5:
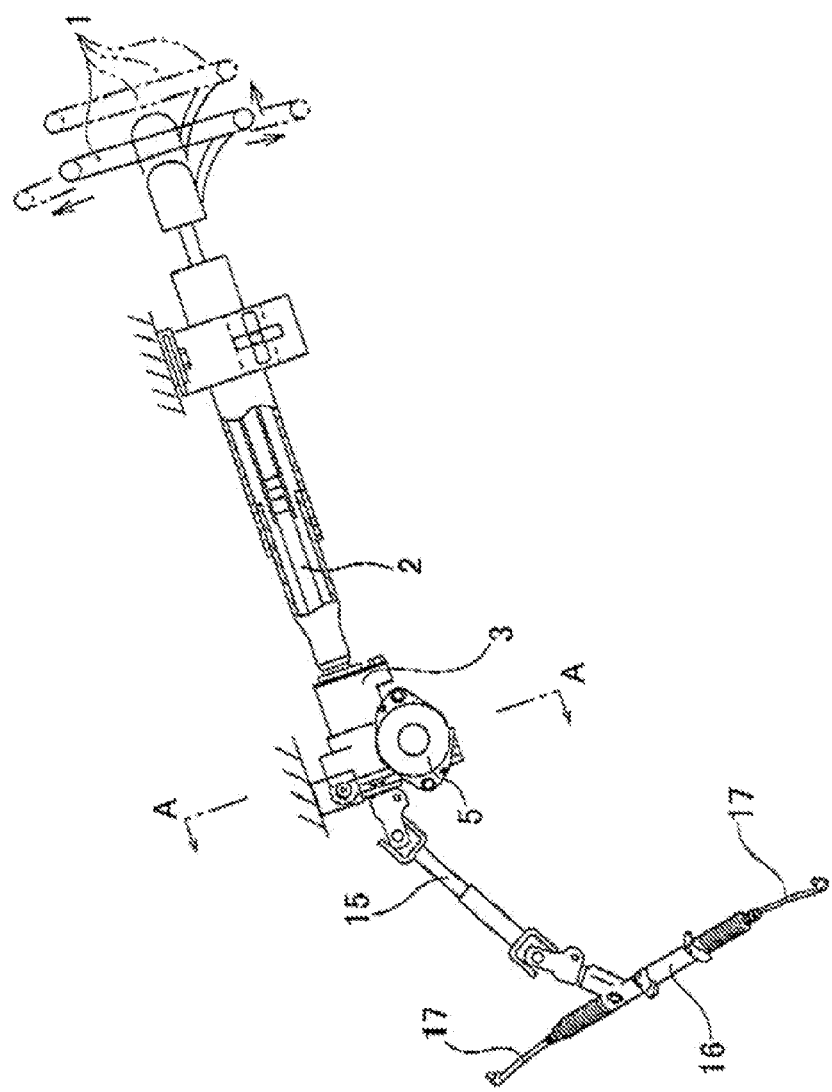
FIG. 5 is a partial cross-sectional side view, and illustrates an example of a conventional electric power-steering apparatus.
Figure 6:
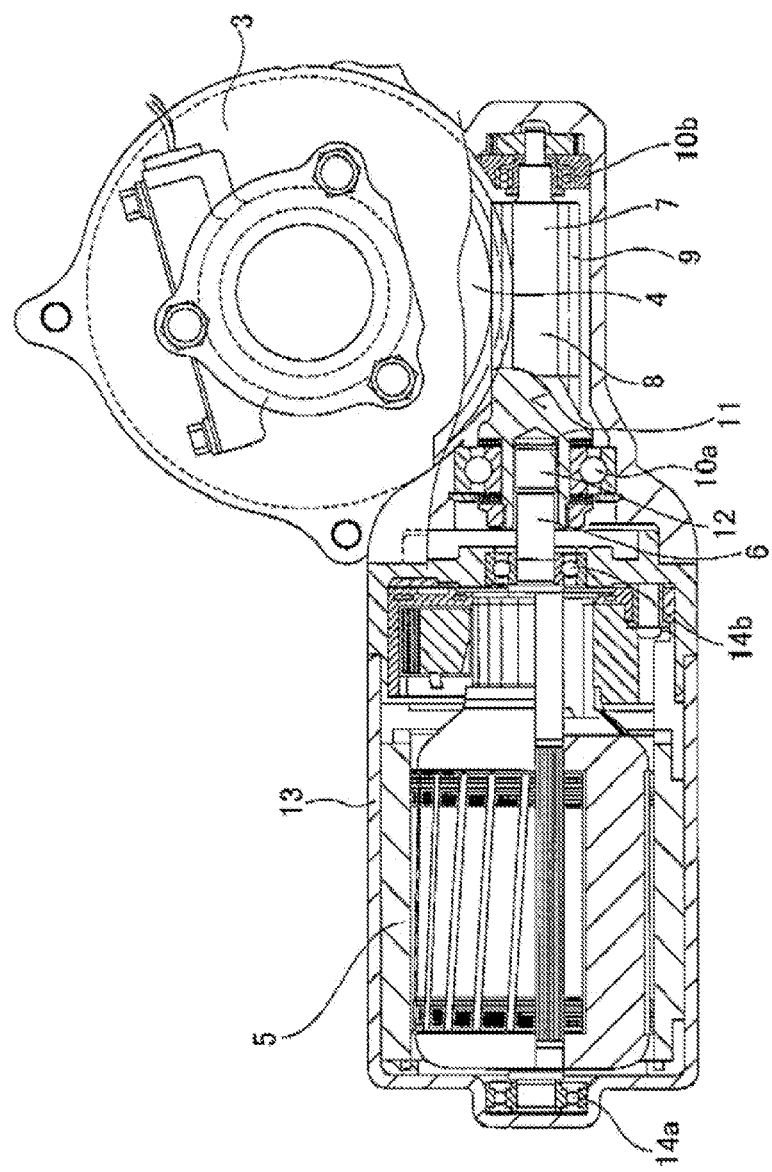
FIG. 6 is an enlarged cross-sectional view of section A-A in FIG. 5.
Figure 7:
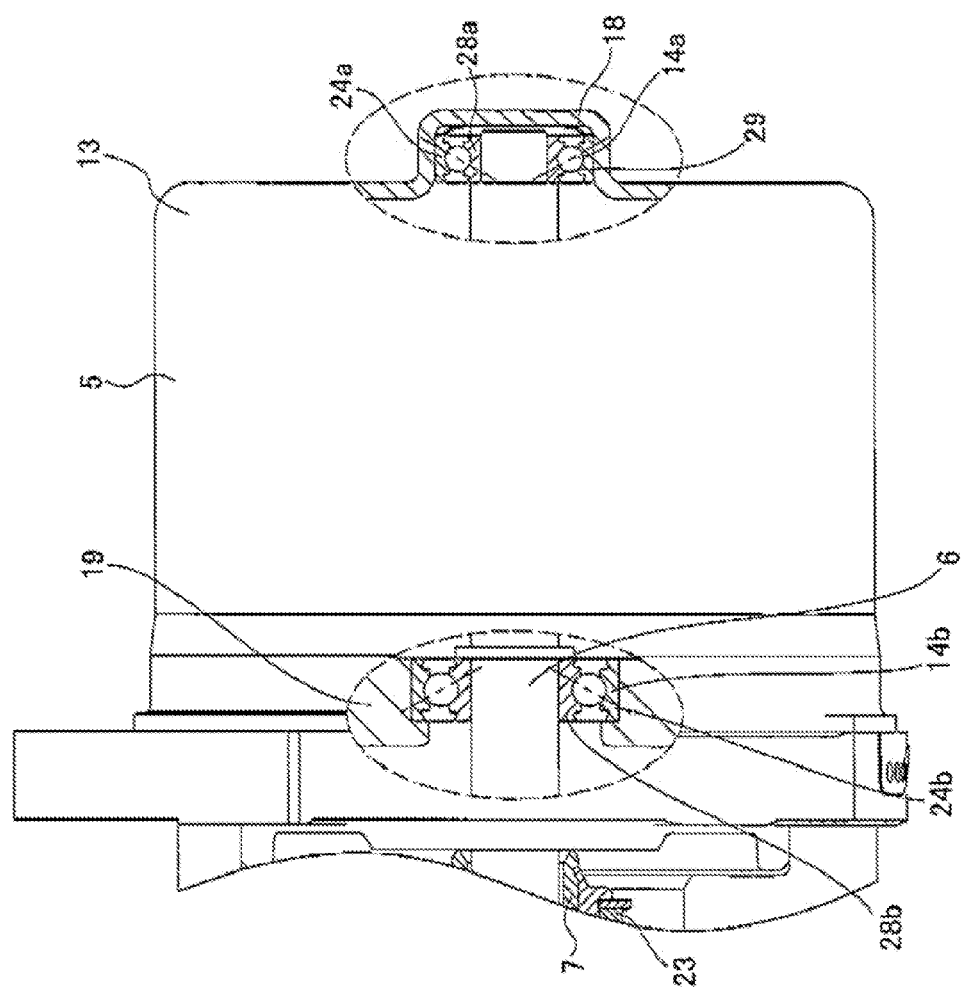
FIG. 7 is the same as FIG. 2, and illustrates an example of conventional construction for preventing backlash in the output shaft of a motor.

The electric power-steering apparatus of this example also comprises a housing 3, a steering shaft 2, which is a rotating shaft, a worm wheel 4, a worm 7, and an electric motor 5. Of these, the housing 3 is supported by and fastened to the vehicle body or to a portion that is fastened to the vehicle body so that it is unable to rotate. A steering wheel 1 (see FIG. 5) is connected to the rear end section of the steering shaft 2, and the steering shaft 2 is rotated by operating the steering wheel 1. Moreover, the front end section of the steering shaft 2 is connected to a mechanism that applies a steering angle to the steered wheels as the steering shaft 2 rotates.

The worm wheel 4 is concentrically supported by and fastened to part (normally, the front end section of the steering shaft 2) of the steering shaft on the inside of the housing 3, and is constructed so as to be able to rotate with the steering shaft 2. The worm 7 has a worm shaft 8 that is provided with worm teeth 9 in the middle section in the axial direction, and with the worm teeth 9 engaged with the worm wheel 4, the worm 7 is supported by the housing 3 so as to be able to rotate freely. Furthermore, the electric motor 5 has a motor case 13 that is supported by and fastened to the housing 3, an output shaft 6a that has a tip end section that is connected to the base end section of the worm shaft so that torque can be transmitted, and a pair of single-row ball bearings 14a, 14b that support the output shaft 6a inside the motor case 13 so as to be able to rotate freely, and this electric motor 5 rotates and drives the worm 7.

The tip end section of the output shaft 6a of the electric motor 5 is connected to the base end section of the worm shaft 8 of the worm 7 by a spline hole 11, which is an engaging hole, fitting with a spline shaft section 12, which is an engagement rod section, with a spline fit, such that torque can be transmitted. However, in the case of a fit between the tip end section of the output shaft and the base end section of the worm shaft other than a spline fit, the same fit can be accomplished with other conventionally known constructions that allow the output shaft and the worm shaft to be connected so that torque can be transmitted. Examples of this kind of construction, are construction wherein engaging holes that have a long circular cross-sectional shape fit with engaging rod sections, or construction using a key fit.

The base end section of the worm shaft 8 is supported by the housing 3 around this spline engagement section by way of a single-row four point contact ball bearing 10A so as to be able to rotate as well as displace a little in the axial direction. The outer ring 20 of the ball bearing 10A fits inside and is fastened to part of the housing 3 with an interference fit, and the inner ring 21 of the ball bearing 10A fits around the outside of the base end section of the worm shaft 8 with an interference fit. An O-ring 22 is held in an elastically compressed state between the bottom surface of a fitting groove that is provided on the outer circumferential surface of the base end section of the worm shaft 8 and the inner circumferential surface of the inner ring 21. Moreover, elastic rings 23 are held between both end surfaces in the axial direction of the inner ring 21 and the portions (in the example in the figures, stepped surfaces that are formed on the outer circumferential surface of the worm shaft 8) that are fastened to the worm 7. These elastic rings 23 have an elastic force in a direction that elastically expands or contracts in the axial direction. Therefore, the worm 7 is supported on the inside of the housing 3 such that there is no backlash, and so as to be able to pivotally displace around the inside portion of the inner ring 21 as well as displace a little in the axial direction.

The output shaft 6a is supported by the motor case 13 by way of a pair of single-row deep-groove ball bearings 14a, 14b so as to be able to rotate freely. It is possible to use single-row angular ball bearings as these ball bearings. The outer rings 24a, 24b of these ball bearings 14a, 14b are supported by and fastened to the inside of the motor case 13 in a state where displacement in a direction away from the worm 7 is prevented.

More specifically, the outer ring 24a of the ball bearing 14a for supporting the base end section (right end section in FIG. 2) of the output shaft 6a fits inside and is fastened with a clearance fit to a small-diameter attachment section 25 having a cylindrical shape with a bottom that is formed in the center section of the bottom plate of the motor case 13. In this example, the back end surface of the small-diameter attachment section 25 corresponds to one of the stepped surfaces on the inner circumferential surface side. In this embodiment, a shim plate 26 is held between the back end surface of the small-diameter attachment section 25 and the end surface in the axial direction of the outer ring 24a. Many kinds of shim plates whose thick dimensions change a little at a time are prepared as the shim plate 26. By selecting a shim plate 26 having an appropriate thickness dimension, and holding that shim plate between the back end surface of the small-diameter attachment section 25 and the end surface in the axial direction of the outer ring 24a, the position in the axial direction of the outer ring 24a can be closely regulated.

The shim plate 26 can also be provided in the space between the end surface in the axial direction of the inner ring 28a and the stepped surface 29 of the output shaft 6a instead of or in addition to being provided in the portion between the end surface in the axial direction of the outer ring 24a of the ball bearing 14a and the back end surface of the small-diameter attachment section 25. However, as illustrated in the example in the figure, construction of providing the shim plate 26 between the end surface in the axial direction of the outer ring 24a and the opposing surface is advantageous in that the diameter of the shim plate 26 can be made large, so it is easy to maintain load capacity.

Moreover, the outer ring 24b of the ball bearing 14b for supporting the portion near the tip end of the output shaft 6a (portion on the left side in FIG. 2) is fitted inside a center hole of a cover plate 19 that is attached to the opening section of the motor case 13, and the end surface in the axial direction comes in contact with a stepped surface 27 that is formed around the inner circumferential surface of this center hole. In this example, this stepped surface 27 corresponds to the other stepped surface of the stepped surfaces on the inner circumferential surface side.

With the construction described above, the outer rings 24a, 24b of the ball bearings 14a, 14b are supported by and fastened to the inside of the motor case 13 in a state where displacement in directions away from the worm 7 is prevented.

On the other hand, the inner rings 28a, 28b of the ball bearings 14a, 14b fit around and are supported by the output shaft 6a in a state where displacement in directions toward the worm 7 is prevented.

More specifically, the inner ring 28a of the ball bearing 14a for supporting the base end section of the output shaft 6a is fitted around and fastened with an interference fit to the small-diameter section that is formed on the base end section of the output shaft 6a, and the end surface in the axial direction of the inner ring 28a comes in contact with the stepped surface 29 of the output shaft 6a that is formed on the back end section of the small-diameter section. In this example, this stepped surface 29 corresponds to one of the stepped surfaces on the outer circumferential surface side.

Moreover, the inner ring 28b of the ball bearing 14b for supporting the portion near the tip end of the output shaft 6a is fitted around and fastened with an interference fit from the base end side of the output shaft 6a to the portion near the tip end of the output shaft 6a. An outward facing flange-shaped collar section 30 is formed around the portion near the tip end of the outer circumferential surface of the output shaft 6a, and the end surface in the radial direction of the inner ring 28b comes in contact with the side surface in the axial direction of the collar section 30. In this example, this side surface in the axial direction corresponds to the other stepped surface of the stepped surfaces on the outer circumferential surface side. By keeping the length of the interference fit between the inner ring 28b and the output shaft 6a to a minimum, it is possible to improve the ease of assembly. In this case, a retaining ring (C ring) 33 can be fitted around the outside of the output shaft 6a such that the end surface in the axial direction of the inner ring 28b comes in contact with the opposing surface.

With the construction described above, the inner rings 28a, 28b of the ball bearings 14a, 14b are supported by and fastened to the base end section and the portion near the tip end of the output shaft 6a in a state where displacement in a direction toward the worm 7 is prevented.

Furthermore, a compression coil spring 31, which is an elastic member, is held in an elastically compressed state between the back end surface of the spline hole 11 and the tip end surface of the spline shaft section 12. This applies an elastic force to the output shaft 6a in a direction away from the worm 7. Based on this elastic force, together with tandem arrangement contact angles (contact angles in the same direction as each other) as illustrated by the chain lines $\alpha$, $\beta$ in FIG. 2, a preload is applied to the ball bearings 14a, 14b that support the output shaft 6a so as to be able to rotate freely. Based on the elastic force of the compression coil spring 31, the preload is applied to both of the ball bearings 14a, 14b, so together with suitably regulating the internal space (particularly, the axial space) of these ball bearings 14a, 14b, the positional relationship between the outer rings 24a, 24b and the inner rings 28a, 28b of these ball bearings 14a, 14b is adequately regulated. In this example, by suitably regulating the thickness of the shim plate 26, the preload is applied to the ball bearings 14a, 14b at the same time.

With construction wherein the outer rings and inner rings of the ball bearings are supported by and fastened to specified portions of the motor case and output shaft, it is also possible to perform only an interference fit without using stepped surfaces. However, in order to sufficiently and surely obtain the function and effect of the present invention, the outer rings and inner rings are preferably fastened with good precision to specified positions of the motor case and output shaft, and that state is maintained over a long period of time. On the other hand, during operation of the electric power-steering apparatus, not only there is a possibility that it will be impossible to avoid small vibration in the motor case and output shaft, but also there is a possibility that there may be a drop in the interference fit due to changes in the temperature, so it is not completely possible to negate the possibility that the fitting surfaces will move. From this aspect, it is preferable that the outer rings and inner rings not only be supported by and fastened to the motor case and output shaft with simply an interference fit, but it is also preferable that the stepped surfaces of this example be used.

The object of the present invention is to prevent the preload of one or both of the ball bearings 14a, 14b from being lost, and prevent the occurrence of backlash in the ball bearings 14a, 14b. Therefore, it is not necessary for the contact angles and the values of the preload of these ball bearings 14a, 14b to be the same as each other. For example, the contact angle and axial space of one ball bearing can be made smaller a little at a time than the contact angle and axial space of the other ball bearing. When this kind of construction is employed, by increasing the amount that the outer ring and inner ring of one ball bearing are displaced in the axial direction after the preload has been applied to the one ball bearing, it is possible to apply the preload to the other ball bearing easily. Which to choose of the ball bearings 14a, 14b as the one ball bearing or other ball bearing can be arbitrarily decided.

The value of the elastic force in the axial direction that is generated by the compression coil spring 31 is made to be greater than the maximum value of the friction force in the axial direction that acts on the spline engagement section between the spline hole 11 and the spline shaft section 12.

More specifically, the value of the elastic force in the axial direction that is generated by the compression coil spring 31 is made to be greater than the value of the friction resistance in the axial direction by an amount that enables the preload to be applied at the same time to the ball bearings 14a, 14b, in a state where this friction resistance to displacement in the axial direction of the spline engagement section becomes a maximum by the torque that is transmitted by the engaging section between the worm wheel 4 and the worm 7 becoming a maximum, the reaction force in the axial direction that is applied to the worm 7 from this engaging section becoming a maximum, and the radial load that is applied to the spline engagement section becoming a maximum.

By regulating the elastic force of the compression coil spring 31 in this way, the compression coil spring 31 can constantly continue to apply pressure to the output shaft 6a toward the right in FIG. 2 with a force such that the preload can continuously be applied to the ball bearings 14a, 14b. In other words, during operation of the electric power-steering apparatus, depending on the direction that auxiliary torque is transmitted from the worm 7 to the worm wheel 4, there may be a tendency for the worm 7 to displace in a direction away from the output shaft 6a. In this case, due to the friction force that acts on the spline engagement section, there is a tendency for the output shaft 6a to be pulled in the direction toward the left in FIG. 1 and FIG. 2. When the output shaft 6a is actually pulled in the left direction in FIG. 1 and FIG. 2, the preload on the ball bearings 14a, 14b is lost. On the other hand, by making the elastic force of the compression coil spring 31 greater than the friction force that acts on the spline engagement section as described above, it is possible to prevent the output shaft 6a from actually being pulled in the left direction in FIG. 1 and FIG. 2. As a result, regardless of the operating status of the electric power-steering apparatus, with the single-row four point contact ball bearing 10A as the base point, the preload is constantly applied to the ball bearings 14a, 14b, and it is possible to prevent the occurrence of strange noise and vibration due to backlash in the rotation support sections of these ball bearings 14a, 14b.

In the case of the electric power-steering apparatus of this example, the direction of the contact angle of the pair of ball bearings 14a, 14b for supporting the output shaft 6a of the electric motor 5 so as to be able to rotate freely is devised. More specifically, a tandem arrangement construction is used that has not been conventionally employed for the support construction of the output shaft of an electric motor. By having a compression coil spring 31 press the output shaft 6a in a direction away from the worm 7, together with devising the direction of the contact angel of the ball bearings 14a, 14b in this way, the preload is applied to the ball bearings 14a, 14b. The installation space for the compression coil spring 31, and particularly the dimension in the axial direction, can be sufficiently maintained, and the operating conditions for the compression coil spring 31 such as contraction during use not being particularly large, are not particularly severe. Therefore, the elastic force of the compression coil spring 31 can be sufficiently maintained over a long period of time. As a result, it becomes possible to stably suppress backlash of the output shaft 6a of the electric motor 5 over a long period of time.

Example 2

Figure 3:
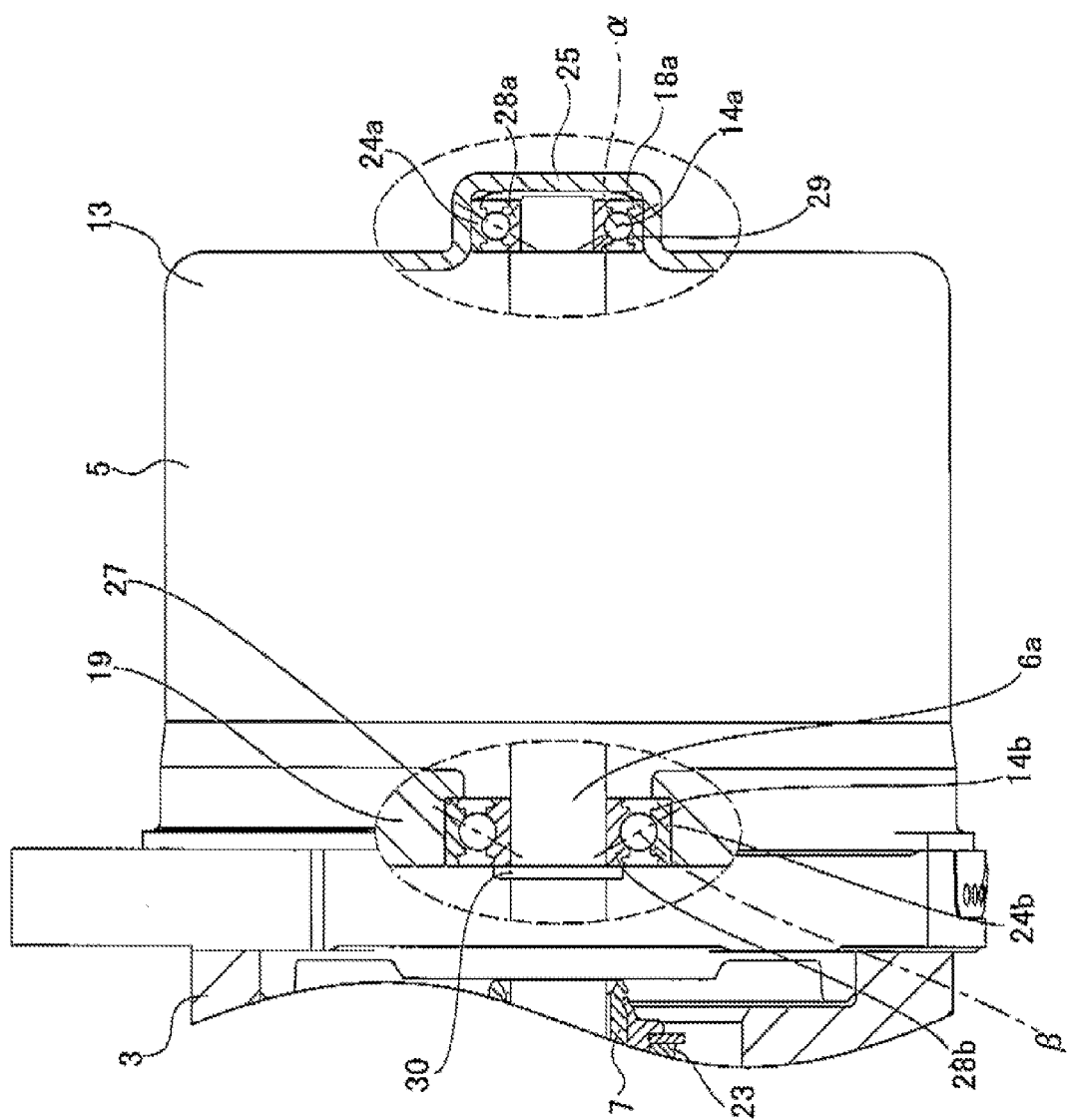
FIG. 3 is the same as FIG. 2, and illustrates a second example of an embodiment of the present invention.

FIG. 3 illustrates a second example of an embodiment of the present invention. In this example, instead of the shim plate 26 that was held between the back end surface of the small-diameter attachment section 25 and the end surface in the axial direction of the outer ring 24a in the first example of the embodiment (see FIG. 2), a plate spring 18a is used. Together with the tandem arrangement contact angles, the preload is applied to the pair of ball bearings 14a, 14b by the elastic force of the plate spring 18a and the elastic force of the compression coil spring 31 (see FIG. 1) that presses the output shaft 6a toward the right in FIG. 3. This plate spring 18a as well can be provided between the end surface in the axial direction of the inner ring 28a and the stepped surface 29 of the output shaft 6a instead of or in addition to being provided in the portion between the end surface in the axial direction of the outer ring 24a of the ball bearing 14a and the base end surface of the small-diameter attachment section 25.

In the case of this example, constructed as described above, adjustment for applying the preload at the same time to the ball bearings 14a, 14b is simplified by the amount that it is possible to expand or contract the dimension in the axial direction of the plate spring 18a. An axial load from the compression coil spring 31 is applied to these ball bearings 14a, 14b, however, a large portion of this axial load is supported by the ball bearing 14b on the worm 7 side. Therefore, it is possible to sufficiently maintain the elastic force of the plate spring 18a over a long period of time without large axial loads being repeatedly applied to the plate spring 18a. By doing so, the internal space of the ball bearing 14b can be eliminated by the compression coil spring 31 and the internal space of the ball bearing 14a can be eliminated by the plate spring 18a. As a result, regardless of the operating status of the electric power-steering apparatus, with the single-row four point contact ball bearing 10A as the base point, the preload is constantly applied to the ball bearings 14a, 14b, so it is possible to prevent the occurrence of strange noise and vibration due to backlash in the rotation support sections of these ball bearings 14a, 14b. The construction and function of other parts are the same as in the first example of an embodiment, so drawings and explanations of identical parts are omitted.

Example 3

Figure 4:
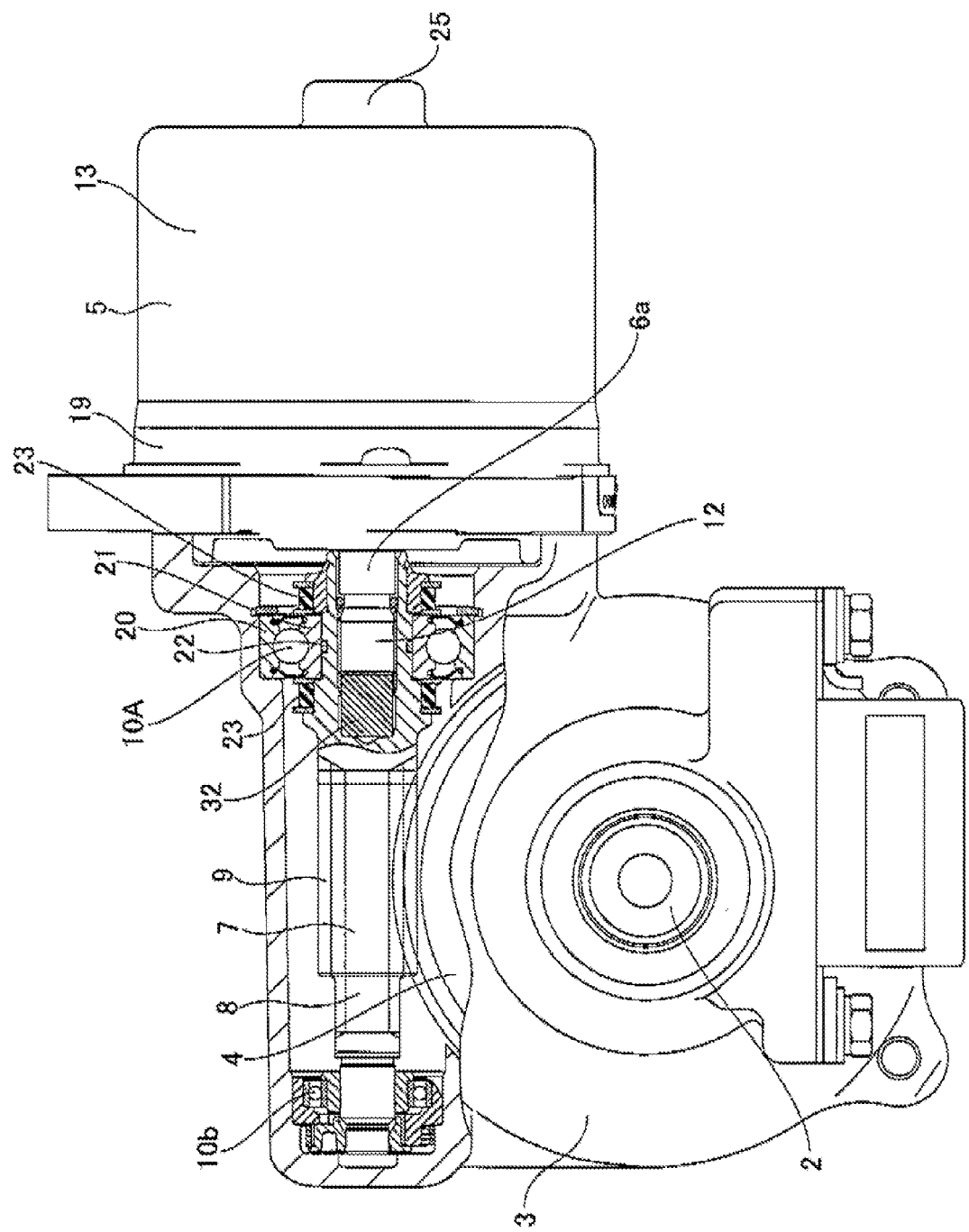
FIG. 4 is the same as FIG. 1, and illustrates a third example of an embodiment of the present invention.

FIG. 4 illustrates a third example of an embodiment of the present invention. In this example, a circular column shaft rubber block 32 is sued as the elastic member for pressing the worm 7 in a direction away from the output shaft 6a. The construction and function of the other parts are the same as in the first or second examples of the embodiment, so the same reference numbers are used for identical parts, and any redundant explanations are omitted.

INDUSTRIAL APPLICABILITY

The present invention is not limited to the examples in the figures, and can be applied to electric power-steering apparatuses having various construction.

EXPLANATION OF REFERENCE NUMBERS

1 Steering wheel
2 Steering shaft
3 Housing
4 Worm wheel
5 Electric motor
6, 6a Output shaft
7 Worm
8 Worm shaft 9 Worm teeth
10a, 10b, 10A Ball bearing
11 Spline hole
12 Spline shaft section
13 Motor case
14a, 14b Ball bearing
15 Intermediate shaft
16 Steering gear unit
17 Tie rod
18, 18a Plate spring
19 Cover plate
20 Outer ring
21 Inner ring
22 O-ring
23 Elastic ring
24a, 24b Outer ring
25 Small-diameter attachment section
26 Shim plate
27 Stepped surface
28a, 28b Inner ring
29 Stepped surface
30 Collar section
31 Compression coil spring
32 Rubber block
33 Retaining ring

What is claimed is:

1. An electric power-steering apparatus, comprising:
a housing supported by and fastened to a vehicle body or having a portion thereof fastened to the vehicle body;
a rotating shaft comprising a front-end section supported by the housing so as to be able to rotate freely, and that applies a steering angle to steered wheels, and a rear-end section connected to a steering wheel;
a worm wheel concentrically supported by and fastened to part of the rotating shaft on the inside of the housing;
a worm comprising a worm shaft that has a base end section and worm teeth provided around a middle section in an axial direction thereof, and, with the worm teeth engaged with the worm wheel, is supported by the housing so as to be able to rotate freely; and
an electric motor that rotates and drives the worm, and comprises: a motor case supported by and fastened to the housing, an output shaft that has a tip end section connected to the base end section of the worm shaft so that torque can be transmitted, and a pair of single-row ball bearings that support the output shaft on the inside of the motor case so as to be able to rotate freely;
each of the pair of single-row ball bearings comprising an outer ring supported on the inside of the motor case in a state where displacement in a direction axially away from the worm is restricted, and an inner ring that fits around a part of the output shaft in a state where displacement in a direction axially toward the worm is restricted;
the base end section of the worm shaft comprising a base end surface, and an engagement hole that has a non-circular cross sectional shape, is open on the base end surface, and has a back end surface;
the tip end section of the output shaft comprising an engagement rod section that has a non-circular cross-sectional shape, engages with the engagement hole and has a tip end surface; and
an elastic member that has an elastic force in the axial direction being held in an elastically compressed state in the axial direction between the back end surface of the engagement hole and the tip end surface of the engagement rod section, and by applying an elastic force to the output shaft in a direction axially away from the worm, the elastic force to the output shaft having a value that is greater than a value of a friction resistance to displacement in the axial direction of an engagement section between the engagement hole and the engagement rod section in a state where the value of the friction resistance becomes a maximum by the torque that is transmitted by an engagement section between the worm wheel and the worm becoming maximum, a reaction force in the radial direction that is applied to the worm from the engagement section between the worm wheel and the worm becoming a maximum, and a radial load that is applied to the engagement section between the engagement hole and the engagement rod section, applies a preload at the same time, together with a tandem arrangement contact angle, to the pair of single-row ball bearings, and
at least one of the outer rings comes in contact with a stepped surface on the inner circumferential side that is formed in part of the motor case by way of a ring-shaped plate spring, a thickness in the axial direction thereof being able to expand and contract, or by way of a shim plate that is selected from among shim plates having different thickness dimensions.

2. The electric power-steering apparatus according to claim 1, wherein
the engagement hole is constructed from a spline hole, and the engagement rod section is constructed from a spline shaft, and by the spline hole and spline shaft fitting together, a spline engagement section is formed between the tip end section of the output shaft and the base end section of the worm shaft.

3. The electric power-steering apparatus according to claim 1, wherein
the contact angle and axial space of one ball bearing of the pair of single-row ball bearings is made smaller than the contact angle and axial space of the other ball bearing.

4. The electric power-steering apparatus according to claim 1, wherein
the base end section of the worm is supported by a four point contact ball bearing on the inside of the housing so as to be able to displace in the axial direction.

5. The electric power-steering apparatus according to claim 4, wherein
elastic members that have an elastic force in a direction in which the dimension in the axial direction elastically expands and contracts are held between both end surfaces in the axial direction of the inner ring of the four point contact ball bearing and the portions that are fastened to the worm shaft.

6. The electric power-steering apparatus according to claim 1, wherein
the elastic member held between the back end surface of the engagement hole and the tip end surface of the engagement rod section is a compression coil spring.

7. The electric power-steering apparatus according to claim 1, wherein
the elastic member held between the back end surface of the engagement hole and the tip end surface of the engagement rod section is a circular column shaped rubber block.

* * * * *